United States Patent Office 3,217,947
Patented Nov. 16, 1965

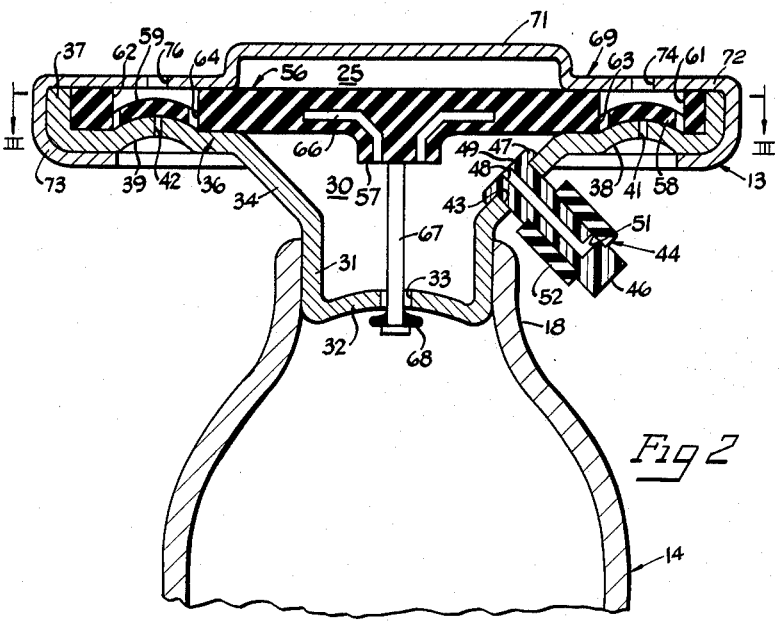
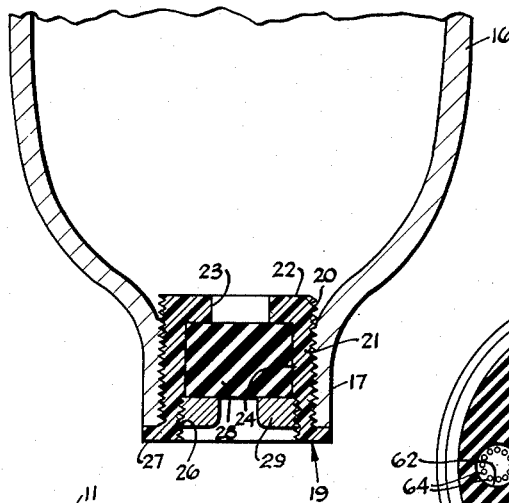
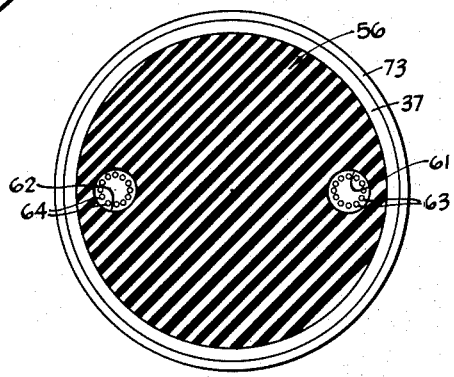
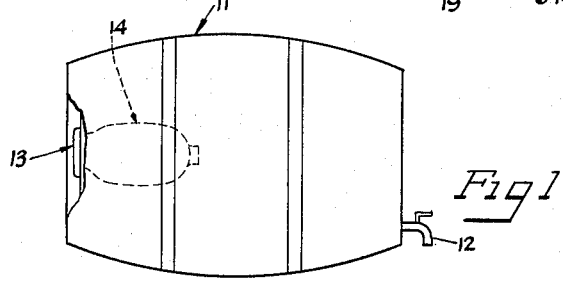

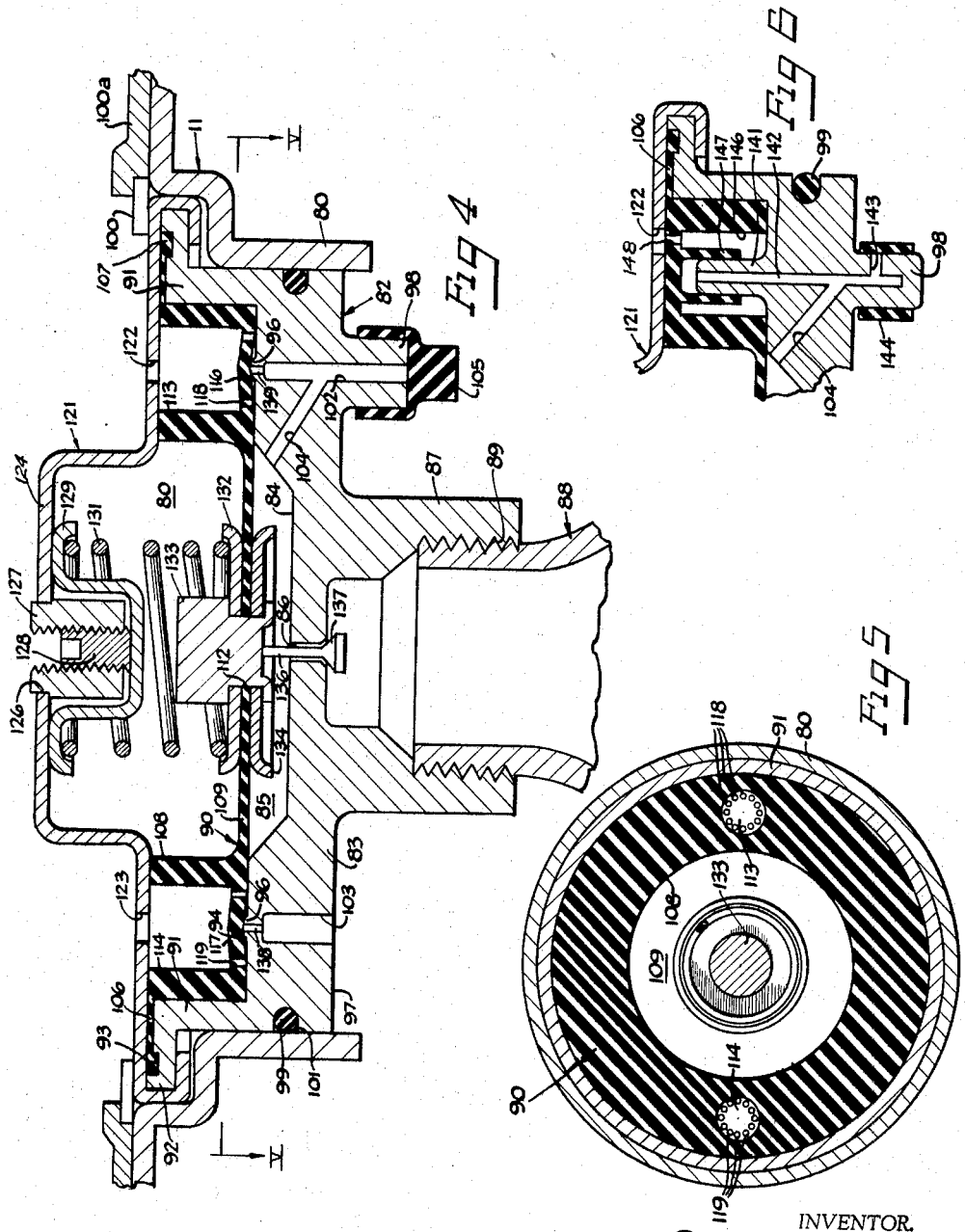

3,217,947
PRESSURE REGULATOR
Carl C. Bauerlein, Clearwater, Fla., assignor to The Dole Valve Company, Morton Grove, Ill., a corporation of Illinois
Filed June 17, 1963, Ser. No. 288,195
7 Claims. (Cl. 222—397)

The present invention relates broadly to regulator valves and more particularly to a means and method of regulating pressure in a pressurized tank.

Liquid dispensing containers have been plagued with many problems. Some of the main problems are to maintain a constant pressure within the dispenser to provide consistent feed of the liquid therein and also preventing explosion of the liquid container caused by an unexpected expansion of the pressurized medium within the liquid container. These problems are especially critical in the case of beer containers. Beer requires a constant pressure exerted thereagainst by the pressurized medium for a sudden surge of pressure would cause the beer to foam. In order to avoid foaming and explosion of the beer keg by pressure buildup therein, expensive means were needed to maintain the beer kegs in a relatively cool environment.

The present invention eliminates the detrimental aspects of prior liquid dispensing containers by providing an improved pressure regulator or relief valve to regulate the fluid pressure of the liquid in the container and to prevent an explosion thereof by an unexpected expansion of said pressure medium.

It is therefore an object of the present invention to provide a fluid dispenser having a pressure medium and a means for regulating the pressure of said pressure medium.

It is another object of the present invention to provide a liquid dispenser having a pressure container connected thereto and means for regulating the flow of pressure medium from the pressure container to the liquid in the container.

It is still another object of the present invention to provide a pressure relief valve to supply a constant fluid pressure.

It is still another object of the present invention to provide a pressure regulator having means to supply a regulated pressure and means to relieve excessive pressure.

It is further another object of the present invention to provide a method of supplying constant pressure to a liquid dispensing container and for relieving excessive pressure in said liquid dispensing container.

These and other objects, features and advantages of the present invention will become more apparent from a careful consideration of the following detailed description, when considered in conjunction with the accompanying drawings illustrating preferred embodiments of the present invention, and wherein like reference numerals and characters refer to like and corresponding parts throughout the several views therein.

On the drawings:

FIGURE 1 is a side elevational view of a beer keg;

FIGURE 2 is a partial longitudinal cross-sectional view of the pressure regulator and pressure tank of the present invention;

FIGURE 3 is a partial transverse cross-sectional view of the pressure regulator of the present invention taken along lines III—III of FIGURE 2;

FIGURE 4 is a partial longitudinal cross-sectional view similar to that of FIGURE 2 illustrating another embodiment of the pressure regulator of the present invention;

FIGURE 5 is a transverse cross-sectional view of the pressure regulator of the present invention taken along lines V—V of FIGURE 4; and FIGURE 6 is a partial longitudinal cross-section through the pressure regulator of FIGURE 4 illustrating an alternative embodiment for the pressure relief arrangement thereof.

As shown on the drawings:

The present invention provides a pressure relief valve for a liquid dispensing container. The container is preferably a household beer keg adapted to be seated on a household refrigerator shelf. The beer keg has a dispensing nozzle at one end and the pressure regulator of the present invention at the other end thereof. The pressure regulator is attached to the other end of the beer keg and is also attached to a pressure fluid supply tank that is preferably extended within the beer keg.

The pressure regulator has a pressure supply chamber which receives pressurized fluid from the pressure tank. The pressure supply chamber has an inlet and an outlet port. The inlet port is regulated to provide a predetermined pressure zone within the pressure chamber to thereby deliver a constant flow of regulated pressurized fluid through the outlet port into the beer keg and into contact with the beer. The regulator has a plurality of pressure relief and check mechanisms to relieve the pressure of the beer keg to the outer atmosphere when said pressure is above a predetermined level. Also the regulator of the present invention will relieve pressurized fluid from the pressure supply chamber to the outer atmosphere when the pressure within the supply chamber is above a predetermined level.

The present invention expeditiously performs its tasks without the need of complicated and expensive mechanisms. My pressure relief valve is a simple means that advantageously uses a single diaphragm as the main means for regulating the pressure of the pressure supply chamber and forming the various pressure relief and check means. Therefore, as will be hereinafter described in detail, I provide a simple relief valve that substantially eliminates the malfunctions of complicated pressure relief valves from the hazards of either freezing or sticking. These hazards are substantially eliminated by eliminating any moving parts from the pressure relief valve except for my regulator diaphragm.

Referring to FIGURES 1 through 3 there is illustrated a household beer keg 11 having a dispensing nozzle 12 at one end and a pressure regulator 13 at its other end. The pressure regulator 13 is affixed by suitable means to a pressurized fluid tank 14 extending within the keg 11.

Although the present invention is described as particularly useful in the household variety beer keg, it is of course, understood that the pressure regulator valve may be utilized with other types of fluid dispensers and pressurized fluid tanks.

The pressurized fluid tank 14 has a tank wall 16 with opposing cylindrical conduit inlet and outlet ends 17 and 18. Threaded into the inlet conduit end 17 is a plastic blow-out plug 19. The plastic blow-out plug 19 has a cylindrical side wall 21 and a base wall 22 defining a port 23 centrally thereof. Said base wall and side wall define a plug cavity 24 and the open end of said plug cavity has threads 26 thereon and an outwardly extending flange 27 to seat the plug flush with the outer surface of the cylindrical end 17.

The plug is threaded into the cylindrical inlet conduit portion 17 and a self-sealing rubber plug 28 is inserted into the plastic plug chamber 24 and seated against the base wall 22. A retaining washer 29 is threaded on threads 26 and holds the self-sealing rubber plug into sealing engagement with the plastic plug 19 to prevent the escape of pressurized fluid from the container 14 therethrough. The plastic plug 19 is calibrated so that the threads 20 thereon will shear at 1300 to 1400 p.s.i.g.

The pressure regulator is divided into an atmospheric chamber 25 and an opposing low pressure supply chamber 30 by a cylindrical rubber diaphragm 56. The pressure supply chamber is formed by a convex base wall 32, a cylindrical neck 31 extending from the base wall, a frusto-conical side wall 34 diverging from the cylindrical neck portion, and the diaphragm 56 forming the top wall. Extending from the end of the frusto-conical side wall 34 is an outwardly extending circular flange 36 having a vertical upturned end 37. The flange portion 36 is provided with at least two convex indentations 38 and 39 having centrally defined ports 41 and 42 respectively.

The supply chamber has an inlet port 33 defined by the base wall 32 and a supply port 43 defined by the conical wall 34. Extending through the supply port is a pressurized fluid supply valve means 44. The valve 44 comprises a plastic plug 46 being made of plastic having low adhesive characteristics when iced i.e. polyethylene. The plug 46 is press fit through the exit port 43 and has an inner flange 47 to prevent the plug from being dislodged from the port 43. The plug defines an L-shaped fluid passage 48 that has an entrance end 49 and a side exit opening 51. The side exit opening is closed by a tubular rubber sleeve 52. The rubber sleeve 52 is held in position on the plastic plug 46 by a cylindrical indentation formed in the plug and providing suitable shoulder means therefor. The size of the passage 48 and the flexibility of the rubber sleeve 52 are predetermined so that the rubber sleeve 52 will flex away from the opening 51 to relieve pressurized fluid at approximately 10 p.s.i.g.

The rubber diaphragm 56 has an inwardly facing central nipple 57 with a plurality of cylindrical cut-outs near its outer periphery.

The diameter of the diaphragm 56 is slightly larger than the inner diameter of the upturned ends 37 and the cylindrical cut-outs are so positioned so that they will coincide with the convex indentations 38 and 39. The cut-outs form relief chambers 61 and 62 having relief base walls 58 and 59 respectively. The relief chambers 61 and 62 face the opposite direction as the protruding nipple 57. The base walls 58 and 59 each respectively have a plurality of ports 63 and 64 along their periphery which are of a predetermined size.

Connected to the nipple portion 57 by suitable means 66 is a reverse poppet valve having a valve stem 67 passing through the inlet 33 into the pressurized fluid tank. Attached to the bottom end of the valve stem 67 is a valve member 68 which is adapted to be seated in the inlet 33 to stop the flow of pressurized fluid therethrough.

The rubber diaphragm 56 is held on the flange 36 by a cover 69 which has a raised central portion 71 forming the atmospheric chamber 25 and an outwardly extending circular flange portion 72 contacting the top surface of the rubber diaphragm and forming the top wall of the relief chambers 61 and 62. The flange 72 has a wrap-around end 73 that is contiguous with the upturned ends 37 and a portion of the flange 36. The flange portion 72 is provided with ports 74 and 76 that are aligned with the ports 41 and 42 respectively, while the raised portion has a port (not shown) to vent the atmospheric chamber 25 to the atmosphere.

The pressure relief valve 13 has its neck 31 inserted into the pressure tank outlet end 18 and attached thereto by suitable means such as welding. The pressure relief valve 13 and pressure tank 14 are attached to the keg 11 by resting the inturned portion of the cover 73 on the keg shoulder and retaining the cover thereon by suitable clamping and sealing means.

In operation, a pressurized fluid, such as $CO_2$ or air, is injected into the pressurized container 14 by inserting a hypodermic needle through the self-sealing rubber plug 28 and injecting $CO_2$ therein. When the container 14 is filled with $CO_2$ having a pressure of approximately 500 p.s.i.g. the hypodermic needle is withdrawn and the self-sealing rubber seals over the passage formed by the hypodermic needle. The entrance 33 is normally open and the $CO_2$ passes into the pressure supply chamber 30. When the pressure in supply chamber 30 reaches approximately between 12 and 15 p.s.i.g. the $CO_2$ pushes up against the rubber diaphragm 56 to cause the valve 68 to close the entrance 33 and prevent further admittance of $CO_2$ into the supply chamber 30.

The supply valve 44 is maintained in a closed position by any suitable clamping means holding the rubber sleeve from flexing open. The clamping means from the supply valve is removed just before the pressure regulator is inserted and fixed and mounted within the keg 11.

Once within the keg 11, $CO_2$ from the supply zone 30 is fed through the valve supply passage 48 into the beer container to thereby pressurize the beer within the keg 11. If the pressure within the beer keg is above 18 p.s.i.g. due to heat or other reasons, the pressure will be relieved by the pressurized medium flowing from the keg into the port 41. The pressurized fluid raises the diaphragm relief chamber base wall 58 and the pressurized fluid flows between the base wall 58 and the convex indentation portion 38 through the ports 63 and into the relief chamber 61 where it is vented into the atmosphere through the port 74. This relief mechanism is regulate to relieve pressure of approximately 18 p.s.i.g.

In a similar manner pressure is relieved through the relief chamber 62 by the port 42. However, the relief valve portion is regulated to relieve pressure of 80 p.s.i.g. The amount of pressure relieved can be predetermined by a combination of methods. The smaller the relief port 41 or 42 the higher the pressure that is needed in order to raise the relief chamber base wall portion. Also the thicker the relief chamber base wall portion the higher the pressure that is needed to flex the base wall away from the indented flange portion.

The relief chambers are also used to relieve excessive pressure occurring within the pressure supply chamber 30. When there is excessive pressure in the supply chamber 30 the excessive pressure will raise the rubber diaphragm portion sitting on the flange 36 to allow pressurized fluid to seep through the closest relief chamber base wall opening into the relief chamber and out into the atmosphere.

Further, in order to prevent a hazardous explosion, the pressurized fluid tank 14 is supplied with a plastic blow-out plug 19 which will blow-out when the pressure within the container reaches approximately 1300 to 1400 p.s.ig. By having a blow-out plug the pressure within the container 14 may be distributed from its smaller volume to the larger volume of the keg.

The use of a rubber sleeve 52 on the plastic plug 46 prevents icing and sticking of the supply valve 44. Icing and sticking can occur due to moisture within the beer or the pressurized $CO_2$ gas which are kept at very low cooling temperatures in order to supply "ice-cold" beer. Also, it is of course understood that if a greater force is needed to urge the diaphragm 56 downward in order to maintain the inlet 33 open, a biasing spring means may be inserted between the raised cover portion 71 and the rubber diaphragm 56.

Referring to FIGURES 4 through 5 there is illustrated a keg pressure regulator or relief valve 82.

The pressure relief valve 82 is divided into an atmospheric chamber 80 and an opposing pressure supply chamber 85 by a cylindrical rubber diaphragm 90. The pressure supply chamber is defined by a valve body portion 83 having a pie-pan cavity with a circular base having a pressure supply chamber inlet 86 therethrough. Extending opposite the pressure supply chamber 85 is an integral tubular extension 87 having a threaded interior to fasten the regulator 82 to a pressure tank 88 having a threaded neck 89.

The body portion 83 has a circular upwardly extending end 91 extending in the direction opposite the tubular extension 87. The end 91 has an integral outwardly extending flange 92 with an annular groove 93. The top surface 94 of the body portion 83 has a plurality of frusto-conical converging protrusions 96. Extending from the bottom surface 97 of the body portion 83 opposite a frusto-conical protrusion is at least one larger cylindrical protrusion 98.

The side wall of the body portion is provided with an annular groove 101 to seat an O-ring 99 that provides a seal with the keg tubular collar 80. The regulator is attached to the key by suitable means such as a retaining snap ring 100 attached to holding means 100a and thereby mounting the regulator on the keg with the pressure tank 88 within the keg.

The body portion is provided with two passages 102 and 103 that extends through the body portion from the top surface of the frusto-conical protrusions 96 to the bottom surface 97 and the bottom surface of the protrusion 98. The passage 102 communicates with a passage 104 that extends from the side wall of the chamber 85 to the passage 102. A rubber sleeve 105 is attached to the protrusion 98 to normally close the passage 102. The size of the passage 102 opening to the beer keg 11 and the flexibility of the rubber sleeve 105 are predetermined so that the rubber sleeve will flex to allow pressurized fluid to flow through the passage 102 to the inside of the keg 11 at a pressure of approximately 10 p.s.i.g.

The circular rubber diaphragm 90 has its bottom surface seated on the body portion top surface 94 and its side wall seated against inner surface of the ends 91. The diaphragm has an outwardly extending circular flange end 106 sitting on top of the flange 92. The flange 106 has an annularly downwardly extending protrusion 107 that fits into the annular groove 93. The diaphragm defines a central cylindrical cavity 108 having a base wall 109 with a predetermined thickness. The base wall defines a circular opening 112.

The cavity forms the atmospheric chamber 80 and is opposite the pie-shaped pressure supply chamber 85 with the wall 109 acting as a common wall therebetween. Two cylindrical valve relief chambers 113 and 114 are provided in the rubber diaphragm and are concentric with the frusto-conical protrusions 96. The cylindrical pressure relief chambers 113 and 114 have respective valve bases 116 and 117 with a plurality of respective ports 118 and 119.

A cover 121 holds the rubber diaphragm in place and the cover has ports 122 and 123 that communicate with the pressure relief chamber 113 and 114 respectively and a raised top portion 124. The raised top portion 124 of the cover has a circular opening 126 that has attached thereto and inserted therein by suitable means an internally threaded tubular plug 127. With the plug 127 is threaded an adjusting bolt means 128 that contacts a top biasing spring retainer 129 which retains a biasing spring 131. The bottom of the biasing spring is retained by spring retaining means 132 suitably fastened to a valve plug holding means 133 which extends through the rubber diaphragm hole 112 and is retained and fastened therein by spring retaining means 132 and retaining means 134. The valve plug 133 has attached thereto by suitable means a poppet valve having a valve stem 136 which extends through the passageway 86. On the end of the valve stem 136 is attached a valve member 137 which is adapted to close the passage 86.

The biasing spring 131 is utilized to adjust the flexibility of the diaphragm wall 109 and thus the pressure of the pressurized fluid in the supply chamber 85. The spring is adjusted by the adjusting screw 128.

The regulator illustrated in FIGURES 4 and 5, operates in a similar manner to the regulator illustrated in FIGURES 1 through 3. The amount of pressure may be regulated by changing the diameter of the passages passing through the frusto-conical protrusions as well as by changing the flexibility of the relief chambers base walls. For example, the passage 103 having a frusto-conical port 138 is designed to relieve 80 to 90 pounds p.s.i.g. while the passage 102 having a frusto-ronical port 139 is designed to relieve approximately 18 p.s.i.g. Also, the passage 102 is used for the dual function of supplying pressurized fluid to the beer medium as well as receiving unduly high pressure in the pressure supply chamber 85 through the port 139 into the relief chamber 113 and vented by the port 122 into the atmosphere. This by-pass arrangement insures a steady flow of pressurized fluid to the beer and prevents a surge of pressurized fluid into the beer which would cause foaming thereof.

The pressure relief arrangement illustrated in FIGURE 6 is similar to that of FIGURE 4 except the regulator is provided with at least one relatively elongated cylindrical protrusion 141 opposite the base protrusion 98 and having a constant diameter flow passage 142 therethrough. Also, the pressure medium is fed through a side port 143 which is covered by a tubular rubber sleeve 144 and is regulated to open at 10 p.s.i.g. to flow pressurized fluid into the beer keg. This embodiment also provides a reverse cup arrangement wherein the rubber diaphragm has its bottom surface cut out to provide a cylindrical pressure relief chamber 146 and a tubular sleeve portion 147. In this embodiment, excessive pressure from the chamber 85 is forced upwards through the passage 142 and flexes the tubular sleeve 147 to allow pressurized fluid to pass therebetween into pressure relief chamber 146 through a relief port 148 and vented into the atmosphere through the cover port 122.

It is of course understood that the illustrated embodiments may be altered to provide more than two pressure relief means by providing more than two pressure relief chambers in the rubber diaphragm with corresponding passages to provide predetermined pressure relief means.

It is therefore illustrated where I have provided a pressure relief valve which eliminates the detriments of prior valves that utilize a number of moving parts which cause the valves to prematurely breakdown and operate improperly due to freeze-up.

It will be understood that these embodiments of the invention have been used for illustrative purposes only and that various modifications and variations in the present invention may be effected without departing from the spirit and scope of the novel concept thereof.

I claim as my invention:
1. A pressure regulator comprising:
   a housing,
   a flexible rubber diaphragm dividing the interior of the housing into opposed atmospheric and pressure supply chambers and at least one peripheral pressure relief chamber,
   said supply chamber having an inlet and an outlet,
   said inlet being connected to means to supply pressurized fluid to the supply chamber,
   a valve connected to said diaphragm and linearly movable therewith to open and close said supply chamber inlet to provide a constant pressure of fluid in the supply chamber,
   a passaged means forming said supply chamber outlet,
   said passaged means having a passage leading from the supply chamber to the exterior of the housing,
   a flexible sleeve mounted on said passaged means blocking the passage leading to the exterior of the housing,
   the diameter of the passage and the flexibility of the sleeve being so dimensioned to allow fluid at a predetermined pressure to flex said sleeve and pass from the supply chamber to the exterior of the housing, a pressure relief chamber inlet and outlet formed in said housing for said pressure relief chamber, said relief chamber inlet being positioned so as to be normally closed by a wall forming said relief chamber, and said relief chamber inlet having a predetermined size and said chamber wall closing said inlet having a predetermined flexibility to allow fluid having a predetermined pressure to flow into the chamber inlet and flex chamber wall to flow into the relief chamber and then vented to the atmosphere through the relief chamber outlet.

2. A pressure regulator comprising:

a housing, a flexible diaphragm dividing the interior of the housing into opposed atmospheric and pressure supply chambers and a first and second peripheral pressure relief chambers, said supply chamber having an inlet and an outlet, said inlet being connected to means to supply pressurized fluid to the supply chamber, a valve means connected to said diaphragm and movable therewith to open and close said supply chamber inlet to provide a constant pressure of fluid in the supply chamber, a passaged means forming said supply chamber outlet, said passaged means having a passage leading from the supply chamber to the exterior of the housing, a flexible sleeve mounted on said passaged means blocking the passage leading to the exterior of the housing, the diameter of the passage and the flexibility of the sleeve being so dimensioned to allow fluid at a predetermined pressure to flex said sleeve and pass from the supply chamber to the exterior of the housing, first and second pressure relief chamber inlets and outlets formed in said housing for said first and second pressure relief chambers respectively, said relief chamber inlet being positioned so as to be normally closed by a wall forming said relief chamber, said first relief chamber having the diameter of its inlet and the flexibility of its wall so dimensioned to allow fluid having a predetermined pressure to flow into the first inlet and flex the wall to flow into the first pressure relief chamber and therefrom vented to the atmosphere through the first relief chamber outlet, and said second relief chamber having the diameter of its inlet and the flexibility of its wall so dimensioned to allow fluid having another predetermined pressure to flow into the second inlet and flex the second wall to flow into the second pressure relief chamber and therefrom vented to the atmosphere through the second relief chamber outlet.

3. A pressure regulator comprising:

a housing, a flexible rubber diaphragm dividing the interior of the housing into opposed atmospheric and pressure supply chambers and a first and second peripheral pressure relief chambers, said supply chamber having an inlet and an outlet, said inlet being connected to a pressurized fluid tank to supply pressurized fluid to the supply chamber, a poppet valve connected to said diaphragm and linearly movable therewith to open and close said supply chamber inlet to provide a constant pressure of fluid in the supply chamber, a plastic passaged plug forming said supply chamber outlet, said plastic plug having a passage leading from the vacuum supply chamber to the exterior of the housing, a flexible rubber sleeve mounted on said plastic plug blocking the passage leading to the exterior of the housing, the diameter of the plastic plug passage and the flexibility of the rubber sleeve being so dimensioned to allow fluid at a predetermined pressure to flex said rubber sleeve and pass from the supply chamber to the exterior of the housing, first and second pressure relief chamber inlets and outlets formed in said housing for said first and second pressure relief chambers respectively, said pressure relief chambers having circular convex bottom walls defining a plurality of ports around the circumference of said bottom walls, said relief chamber inlet being positioned in the center of said plurality of base wall ports and normally closed by said base wall, said first relief chamber having the diameter of its inlet and the flexibility of its base so dimensioned to allow fluid having a predetermined pressure to flow into the first inlet and flex the first base wall to flow through the first base wall ports into the first pressure relief chamber and to the atmosphere through the first relief chamber outlet port, and said second relief chamber having the diameter of its inlet and the flexibility of its base so dimensioned to allow fluid having another predetermined pressure to flow into the second inlet and flex the second base wall to flow through the second base wall ports into the second pressure relief chamber and to the atmosphere through the second relief chamber outlet.

4. A beer keg having beer therein comprising:

a spigot attached to one end of the keg to drain beer therefrom, a pressure regulator attached to the other end of the keg, a pressure tank containing pressurized fluid attached to said pressure regulator and extending within said beer keg, said pressure regulator having a housing, a flexible rubber diaphragm dividing the interior of the housing into opposed atmospheric and pressure supply chambers and at least one peripheral pressure relief chamber, said supply chamber having an inlet and an outlet, said inlet being connected to the pressurized fluid tank that supplies pressurized fluid to the supply chamber, a poppet valve connected to said diaphragm and linearly movable therewith to open and close said supply chamber inlet to provide a constant pressure of fluid in the supply chamber, a passaged means forming said supply chamber outlet, said plastic plug having a passage leading from the vacuum supply chamber to the interior of the beer keg to supply the beer in the keg with pressurized fluid, a flexible rubber sleeve mounted on said passaged means blocking the passage leading to the interior of the keg, the diameter of the passage means passage and the flexibility of the rubber sleeve being so dimensioned to allow fluid at a predetermined pressure to flex said rubber sleeve and pass from the supply chamber to the interior of the keg, a pressure relief chamber inlet and outlet formed in said housing for said pressure relief chamber communicating with the interior of said keg, said relief chamber inlet being normally closed by a relief chamber wall, said first relief chamber having the diameter of its inlet and the flexibility of its chamber wall dimensioned so as to allow fluid having a predetermined pressure to flow into the inlet from the interior of said keg and flex the chamber wall to flow into the pressure relief chamber and then vented therefrom to the atmosphere through the relief chamber outlet.

5. A pressure regulator comprising
a housing,
a pressure supply chamber and an atmospheric chamber formed within said housing,
a resilient diaphragm extending across the interior of said housing and forming a common wall for said chambers,
a pressurized fluid tank mounted at said housing adjacent said pressure supply chamber,
a passage member having a passage extending therethrough and conducting between said pressure supply supply chamber and said pressurized fluid tank,
a valve seat formed about said passage at said passage member,
a valve stem fixedly secured to said substantially resilient diaphragm and having a valve head attached thereto, said valve head being cooperable with said valve seat,
said substantially resilient diaphragm having inherent rigidity resisting pressures within said pressure supply chamber and thereby biasing said valve head toward an opened position.

6. A pressure regulator comprising
a housing,
a pressure supply chamber and an atmospheric chamber formed within said housing,
a resilient diaphragm extending across the interior of said housing and forming a common wall for said chambers,
a pressurized fluid tank mounted at said housing adjacent said pressure supply chamber,
a passage member having a passage extending therethrough and conducting between said pressure supply chamber and said pressurized fluid tank,
a valve seat formed about said passage at said passage member,
a valve stem fixedly secured to said substantially resilient diaphragm and having a valve head attached thereto, said valve head being cooperable with said valve seat,
a pressure relief chamber formed within said housing having an inwardly extending spherical segment, said spherical segment having a relief passage extending therethrough,
said substantially resilient diaphragm having a portion thereof stress fitted about said inwardly extending spherical segment and blocking said relief passage,
said portion having a diaphragm passage extending therethrough,
said diaphragm passage being discontinuous with said relief passage under pressure free conditions.

7. A pressure regulator comprising
a housing,
a pressure supply chamber and an atmospheric chamber formed within said housing,
a resilient diaphragm extending across the interior of said housing and forming a common wall for said chambers,
a pressurized fluid tank mounted at said housing adjacent said pressure supply chamber,
a passage member having a passage extending therethrough and conducting between said pressure supply chamber and said pressurized fluid tank,
a valve seat formed about said passage at said passage member,
a valve stem fixedly secured to said substantially resilient diaphragm and having a valve head attached thereto, said valve head being cooperable with said valve seat,
said substantially resilient diaphragm having inherent rigidity resisting pressures within said pressure supply chamber and thereby biasing said valve head toward an opened position,
a pressure relief chamber formed within said housing having an inwardly extending spherical segment,
said spherical segment having a relief passage extending therethrough,
said substantially resilient diaphragm having a portion thereof stress fitted about said inwardly extending spherical segment and blocking said relief passage,
said portion having a diaphragm passage extending therethrough,
said diaphragm passage being discontinuous with said relief passage under pressure free conditions,
an outlet within said housing leading from said pressure supply chamber,
a protuberance at said housing disposed about said outlet and extending without said pressure supply chamber,
a substantially resilient member contiguous with the outside surface of said protuberance and blocking said outlet under pressure free conditions.

References Cited by the Examiner
UNITED STATES PATENTS

| | | | |
|---|---|---|---|
| 445,257 | 1/1891 | Beck | 222—399 X |
| 1,238,271 | 8/1917 | Crovo | 222—396 X |
| 2,571,433 | 10/1951 | Fine et al. | 222—399 X |
| 3,039,661 | 6/1962 | Wentz et al. | 222—396 |
| 3,127,059 | 3/1964 | Lawrence et al. | 222—399 X |
| 3,128,019 | 4/1964 | Mills | 222—396 |

LOUIS J. DEMBO, *Primary Examiner.*